(12) United States Patent
Cornet et al.

(10) Patent No.: US 7,308,561 B2
(45) Date of Patent: Dec. 11, 2007

(54) FAST, SCALABLE PATTERN-MATCHING ENGINE

(75) Inventors: Jerome Cornet, Ottawa (CA); Robert Elliott Robotham, Ottawa (CA); Gerard Damm, Ottawa (CA)

(73) Assignee: Alcatel Lucent, Paris (FR)

( * ) Notice: Subject to any disclaimer, the term of this patent is extended or adjusted under 35 U.S.C. 154(b) by 594 days.

(21) Appl. No.: 10/733,343

(22) Filed: Dec. 12, 2003

(65) Prior Publication Data

US 2005/0132107 A1    Jun. 16, 2005

(51) Int. Cl.
*G06F 7/06* (2006.01)
(52) U.S. Cl. ..................................... 712/200
(58) Field of Classification Search .................. 700/73, 700/74; 707/6; 726/23, 24, 30, 13; 712/200
See application file for complete search history.

(56) References Cited

U.S. PATENT DOCUMENTS

| | | | | |
|---|---|---|---|---|
| 4,550,436 A * | 10/1985 | Freeman et al. | ............ | 382/218 |
| 4,551,850 A * | 11/1985 | Werth et al. | ................ | 382/170 |
| 4,606,069 A * | 8/1986 | Johnsen | ...................... | 382/243 |
| 5,003,558 A * | 3/1991 | Gregg | ......................... | 375/357 |
| 5,065,396 A * | 11/1991 | Castellano et al. | ......... | 370/536 |
| 5,375,142 A * | 12/1994 | Pitot et al. | ................... | 375/224 |
| 5,450,351 A * | 9/1995 | Heddes | ......................... | 365/49 |
| 5,475,815 A * | 12/1995 | Byers et al. | .................. | 714/32 |
| 5,521,921 A * | 5/1996 | Murai | ......................... | 370/471 |
| 5,525,982 A * | 6/1996 | Cheng et al. | .................. | 341/51 |
| 5,553,082 A * | 9/1996 | Connor et al. | .............. | 714/733 |
| 5,703,964 A * | 12/1997 | Menon et al. | .............. | 382/228 |
| 5,982,681 A * | 11/1999 | Schwarz | ....................... | 365/201 |
| 6,097,206 A * | 8/2000 | Takano | ........................ | 324/765 |
| 6,158,014 A * | 12/2000 | Henson | ....................... | 713/501 |
| 6,201,829 B1 * | 3/2001 | Schneider | .................... | 375/221 |
| 6,260,167 B1 * | 7/2001 | Lo et al. | ...................... | 714/744 |
| 6,288,656 B1 * | 9/2001 | Desai | .......................... | 341/100 |
| 6,535,641 B1 * | 3/2003 | Baggenstoss | ................ | 382/228 |
| 6,587,979 B1 * | 7/2003 | Kraus et al. | ................ | 714/720 |
| 6,792,003 B1 * | 9/2004 | Potluri et al. | ............... | 370/476 |
| 6,920,590 B2 * | 7/2005 | Nakamura | .................... | 714/703 |
| 6,959,297 B2 * | 10/2005 | Oh et al. | ........................ | 707/6 |
| 2002/0077995 A1 * | 6/2002 | Allison et al. | .................. | 707/1 |

OTHER PUBLICATIONS

Baeza-Yates, Ricardo, et al., A New Approach to Text Searching, Communications of the ACM, vol. 35 No. 10, Oct. 1992.

* cited by examiner

*Primary Examiner*—Eric Coleman
(74) *Attorney, Agent, or Firm*—Kramer & Amado, P.C.

(57) ABSTRACT

A fast and scalable pattern making engine is presented. The engine represents variations on a Shift-And method capable of matching patterns in data streams having high speed data rates. In one aspect of the invention high speed is achieved by accessing the pattern RAM in parallel. In another aspect, the input is likened to TDM and individual slots or channels are accessed separately. The two aspects can also be combined to provide a scalable and high speed pattern matching engine. The engine is adaptable to streams of known length or more complex expressions such as regular expressions with arbitrary length.

16 Claims, 7 Drawing Sheets

The fast, scalable engine

Figure 1: A basic "shift-and" engine

Figure 2: Optimizing for speed

Figure 3: Channelization

Figure 4: The fast, scalable engine

Figure 5: Details of the simple engine

Figure 6: Details of the automaton from Figure 2

Figure 7: Details of Figure 3

Figure 8: Tuning of the automaton for arbitrary length (short)

Figure 9: Tuning of the automaton for chaining

Figure 10: High level view of the engine with chaining I/O

Figure 11: High level simple engine with I/O

Figure 12: Matching long patterns

Figure 13: Support for e1(e2 | e3)

Figure 14: Support for .*e1 or e1

FAST, SCALABLE PATTERN-MATCHING ENGINE

FIELD OF THE INVENTION

This invention relates to pattern matching and more particularly to high speed and scalable pattern matching engines.

BACKGROUND

Typically, pattern matching involves the comparison of a large body of text, characters, etc. with a known string or pattern with a view to locating the string or pattern within the body of text, characters, etc. Pattern matching has many applications ranging from word processing to genomics and protein sequencing but has not yet been widely used in communications applications because of the difficulty of implementing an engine that could match complex patterns at very high speeds.

A known pattern matching solution makes use of a "Shift-Or" method which uses bitwise techniques. The Shift-Or method is described in "A New Approach To Text Searching", by R. Baeza-Yates and G. H. Gonnet, Communications of the ACM 35(10), and is characterized by an intrinsic parallelism which makes it slow when executed on a general purpose processor (GPP) but that can be exploited when targeting a hardware implementation.

Figure 1:
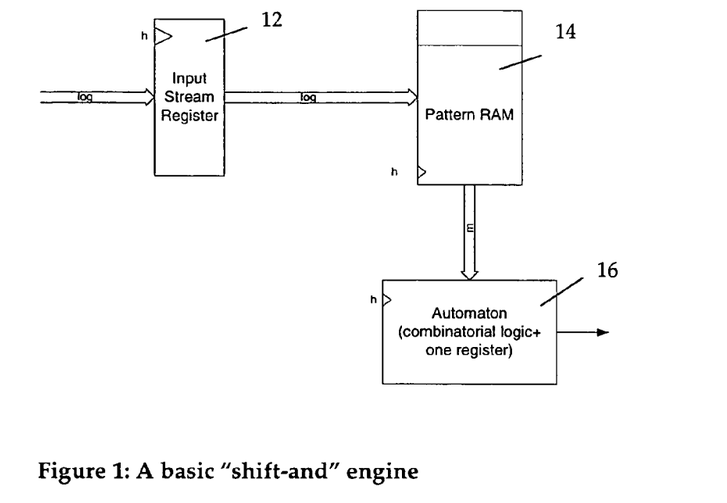
FIG. 1 illustrates a basic shift and engine.

A variant of the Shift-Or method known as a Shift-And method can also be used for pattern matching implementations. A high level hardware implementation of an engine executing the Shift-And method is illustrated in FIG. 1. In this implementation the pattern RAM is filled with the string before running the engine according to the preprocessing part of the method. The preprocessing part of the method corresponds to the table R and is σ high and m-bits wide.

The input stream register receives the characters of the input text, usually bytes. The register uses the characters to address the pattern RAM. Then the results of the reading of the memory is fed to the automaton which is a simple shift/and combinatory logic with a register. All the components are clocked with the same clock h.

The Shift-Or and Shift-And methods have a relatively poor performance compared to other pattern matching methods. However, they are suitable for hardware implementations and can be well optimized.

In addition to the Shift-And method described above other solutions involve pattern matching engines using a tree-based approach. In this solution the pattern is preprocessed to create a huge tree with every incoming bit of the input text making the engine follow the branches of the tree. Although the solution is believed to be quite fast the memory requirements are huge and does not scale well. Another draw back to this solution is that the preprocessing time is significant making the solution unsuitable for fast changing patterns.

Pattern matching is a base building block for content-aware applications such as web (http) load balancing, application aware classification/billing, intrusion detection systems, etc. Accordingly, there is a need for a pattern matching engine capable of processing input streams at high speeds and that is scalable.

SUMMARY OF THE INVENTION

It is an object of the present invention to provide a fast and scalable pattern matching engine capable of matching the same pattern on different input streams or channels.

In accordance with a first aspect of the present invention there is provided a system for detecting a pattern in a data stream comprising: a FIFO for receiving an N-bit wide data stream and a corresponding first clock signal at a first rate, and outputting the data stream as a W times N-bit wide data stream and a corresponding second clock signal at a second rate, where W is an integer natural number and the second rate equals the first rate divided by W; a bus splitter for splitting the W times N-bit wide data stream into W data streams of width N; a plurality (W) of RAMs, each RAM for storing data obtained by processing the pattern and for receiving a respective one of the data streams of width N as an address and the second clock signal as a clock, and each RAM being operable to output a portion of the data on an M-bit wide output bus in accordance with a value of the address; and a processor for receiving the portions of data on each M-bit wide output bus as data and the second clock signal as a clock, and being operable to determine whether the pattern is in the data stream in dependence upon the received portions of data and the received clock, and for outputting a pattern match signal indicating detection of the pattern in the data stream.

In accordance with a second aspect of the present invention there is provided a system for detecting a pattern in a data stream comprising: an input stream register for receiving the data stream and a corresponding first clock signal at a first rate, and outputting the data stream and a corresponding second clock signal at a second rate; a pattern RAM for storing a pattern to be detected; a processor for receiving the data and the second clock signal as a clock, and being operable to determine whether the pattern is in the data stream in dependence upon the received data and the received clock, and for outputting a pattern match signal indicating detection of the pattern in the data stream a channel state RAM for storing the state of the processor and running C times slower the data rate a multiplexer that redirects either the contents of the processor's register or the contents of the channel state RAM to the processor; and a channel register to switch the processor in dependence on the received data.

In accordance with a third aspect of the present invention there is provided a method of detecting a pattern in a data stream comprising: receiving, at a FIFO, an N-bit wide data stream and a corresponding first clock signal at a first rate, and outputting the data stream as a W times N-bit wide data stream and a corresponding second clock signal at a second rate, where W is an integer natural number and the second rate equals the first rate divided by W; splitting the W times N-bit wide data stream into W data streams of width N; providing a plurality (W) of RAMs, each RAM for storing data obtained by processing the pattern and for receiving a respective one of the data streams of width N as an address and the second clock signal as a clock, and each RAM being operable to output a portion of the data on an M-bit wide output bus in accordance with a value of the address; and receiving the portions of data on each M-bit wide output bus as data and the second clock signal as a clock at a processor, the processor being operable to determine whether the pattern is in the data stream in dependence upon the received portions of data and the received clock, and outputting a pattern match signal indicating detection of the pattern in the data stream.

In accordance with a further aspect of the present invention there is provided a method of detecting a pattern in a data stream comprising: receiving the data stream and a corresponding first clock signal at a first rate at an input stream register and outputting the data stream and a corresponding second clock signal at a second rate; storing a pattern to be detected at a pattern RAM; receiving the data and the second clock signal as a clock at a processor, the processor being operable to determine whether the pattern is in the data stream in dependence upon the received data and the received clock, and outputting a pattern match signal indicating detection of the pattern in the data stream; providing a channel state RAM for storing the state of the processor and running C times slower the data rate redirecting either the contents of the processor's register or the contents of the channel state RAM to the processor; and switching the processor in dependence on the received data.

BRIEF DESCRIPTION OF THE DRAWINGS

The invention will now be described in greater detail with reference to the attached drawings wherein.

DETAILED DESCRIPTION OF THE INVENTION

The speed and scalability aspects of the invention are achieved through a variation of the basic Shift-And engine shown in FIG. 1. In FIG. 1 input stream register 12 passes the stream to the pattern RAM 14 and the output is fed to the automaton 16 which provides an output if a match is found. The major issue with this implementation is that the pattern RAM has to run as fast as the input stream register. This is not realistic when the speed of the interface reaches a few Gbps per second. For example, at 10 Gbps, using 8-bits symbols the RAM speed would be 1.25 GHz. Current RAMs can be made to operate at a few hundred MHz. Typically the speed of RAMs usually increases slower than the speed of interfaces.

For the sake of software description the following conventions are used:

m is the number of characters in the pattern the array P[] is the pattern itself n is the number of characters in the input text the array T[] is the input text itself is the number of characters in the alphabet c will be a character (0<=c<σ) in all equations i will a pointer in the input text in all equations The software description of the shift-and method follows:

When the pattern is entered, a table R containing σ lines of m-bit numbers is created with the following rule

[Preprocessing] the $m^{th}$ bit at line c (0<=c<σ) is set iff the character c leads to a transition to the state m which is equivalent to the $m^{th}$ bit at line c is set iff the P[m]=c Let s be the a register, containing m bits, and T[i] the current character being examined in the input string.

let s=0 and i=0 while (there is some input text and the $m^{th}$ bit of s is not set)

```
{
    c=T[i]
    s= ( s<<1 | 1 ) & R[c]
    i=i+1
}
``` if (the $m^{th}$ bit of s is set), then the input text matched the pattern at offset i else the input text did not match the pattern.

Figure 5:
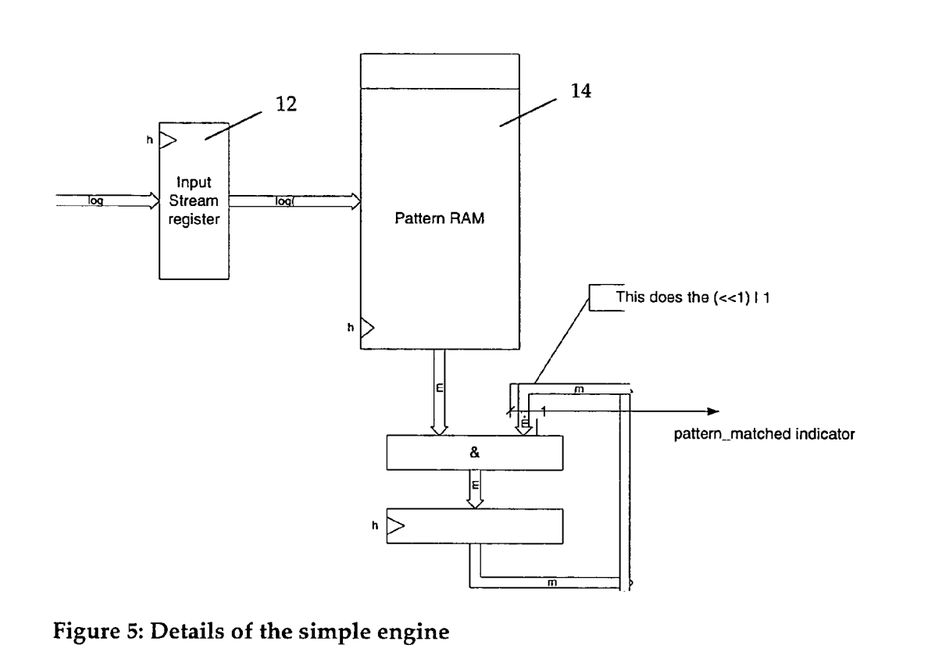
FIG. 5 illustrates details of the automaton of FIG. 1.

FIG. 5 describes a hardware implementation of this method

The Input register implements the operation c=T[i]; i=i+1

The Pattern RAM implements the operation R[c] (and is filled before running with the contents of the table R).

The automaton implements the operation s=(s<<1|1) & R[c]

(the register of the automaton contains s)

Figure 2:
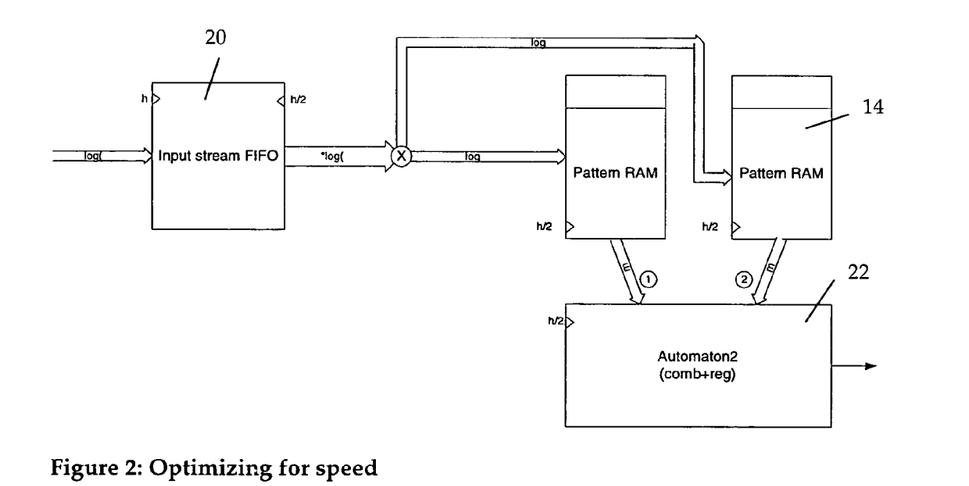
FIG. 2 is a high level drawing of a shift and engine with speed optimizing.
Figure 3:
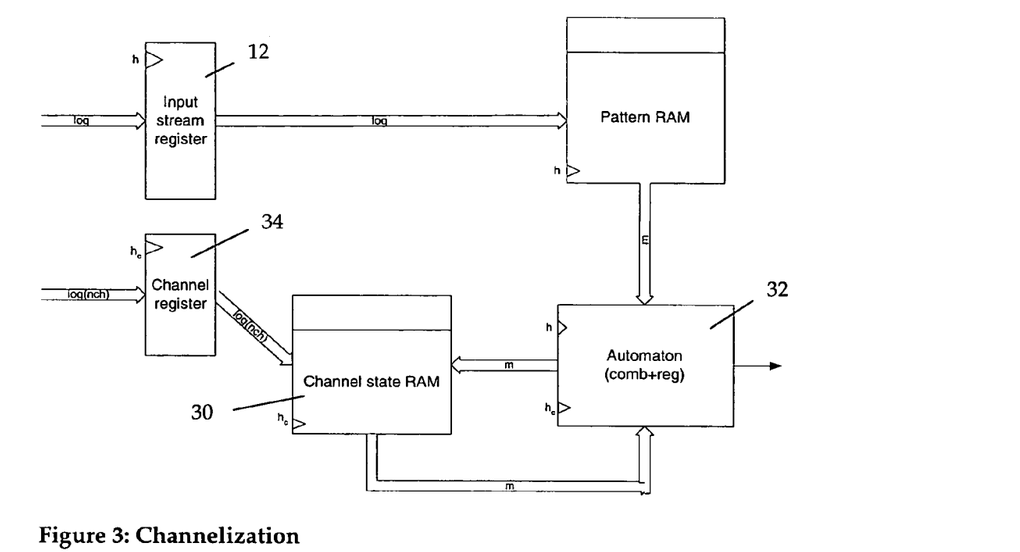
FIG. 3 illustrates a shift and engine with channelization.
Figure 6:
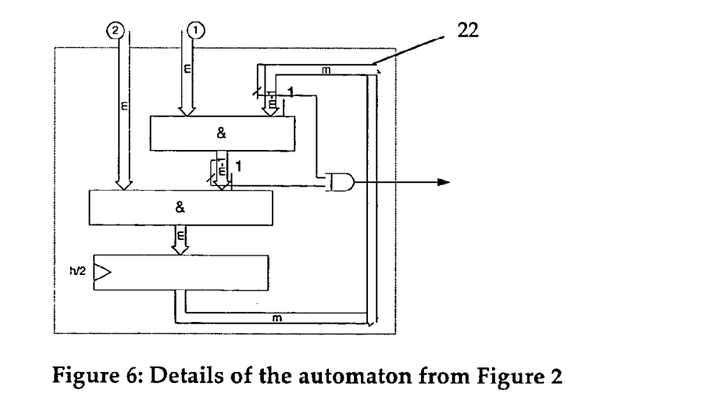
FIG. 6 illustrates details of the automaton of FIG. 2.
Figure 7:
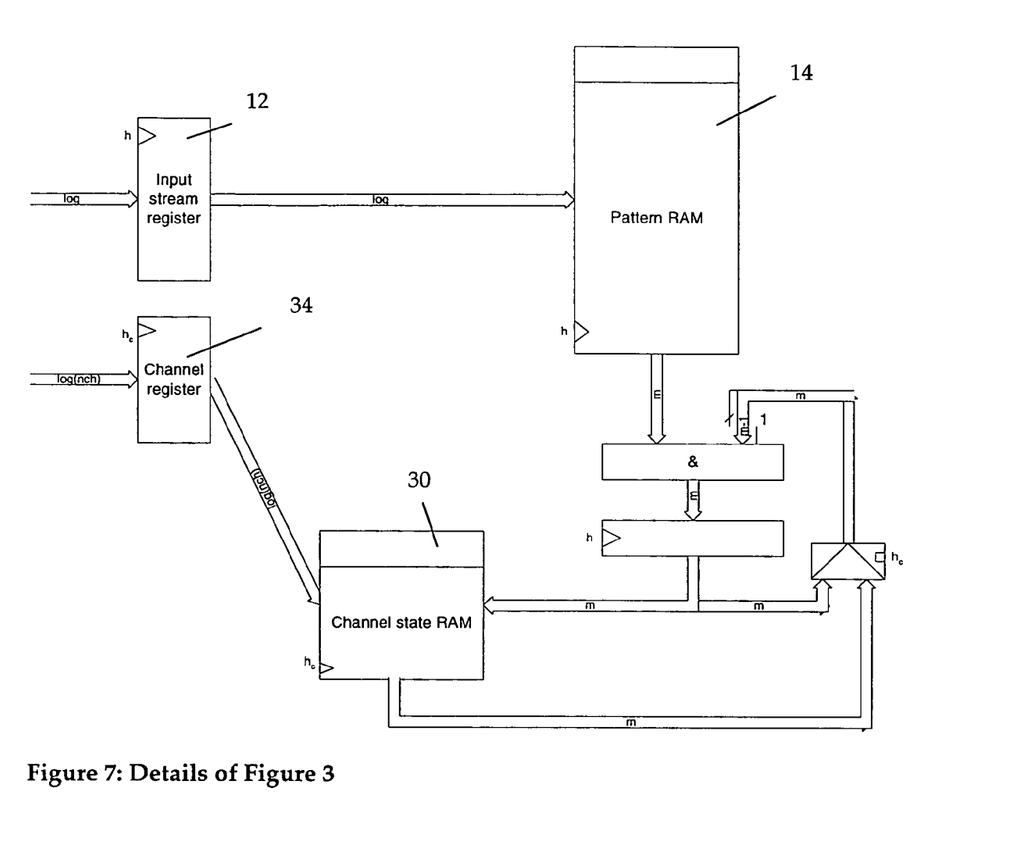
FIG. 7 shows greater details of the engine of FIG. 3.

FIG. 6 provides greater detail of the automaton shown in FIG. 2 while FIG. 7 shows greater detail of the automaton shown in FIG. 3.

In a first embodiment of the present invention the memory accesses are parallelized. This is possible because the memory access depends on the input stream only for the Shift-And method. FIG. 2 illustrates the concept which leads to the first embodiment. As shown in FIG. 2 the input stream register of the basic engine is replaced with a width changing FIFO 20. In this example the FIFO output is x times larger than the input, thus x=2 in FIG. 2. In this solution the memory accesses are done in parallel with memories which can be x times slower. The content of the memories is identical to those of the pattern RAM 14 of FIG. 1 they have just been replicated. The automaton 22 is a bit more complex because it has to manage x inputs each being m-bits wide instead of one input that is m-bits wide as shown in FIG. 1. In any event the automaton 22 is still fairly easy to achieve because it uses only combinatory logic and a register. It is interesting to note that the overall speed of the automaton 22 is divided by x and the complexity increases linearly only with x. To scale up to the higher interface speeds in the present invention it is possible to compensate by using faster RAMs or by adding more RAMs.

As a second embodiment of the present invention there is provided a concept of enabling channelization. This concept is shown in FIG. 3. Again this is a modification of the basic Shift And engine of FIG. 1.

In the implementation of this embodiment the input interface can be likened to time division multiplexing (TDM) where each time slot would be z characters long. In this implementation the channel change happens every $h_c$=h/z clock cycles.

As noted in FIG. 3 the input stream register 12 passes the pattern through to the preprocessed pattern RAM 14. In this case a channel state RAM 30 to store-restore the state of the automaton 32 for each channel at each time slot is added. This channel RAM (height=number of channels, width=m) will be indexed by the channel number and contains the current state of the automaton 32 i.e., the contents of the register running for this channel. A channel register 34 is added to switch the automaton. The extra memory needed is small and also increases linearly with the number of channels. Every time the channel changes from old_channel to new channel (old channel+1 modulo number of channels for TDM line) the content of the automaton's register is written at address old_channel in the channel RAM and the content of the channel RAM at offset new_channel is fed to the automaton as shown in FIG. 7.

Tuning this mechanism is relatively trivial to allow the use of common input/output interfaces like SPI4.2 or CSIX rather than a TDM-like input. The only restriction on the input interface being that the channel change has to be slower than the speed of the channel RAM. In any event this is the case for the two interfaces known above. For those two interface types, the channel changes arbitrarily and the time slot is of variable size with a given minimum.

Figure 4:
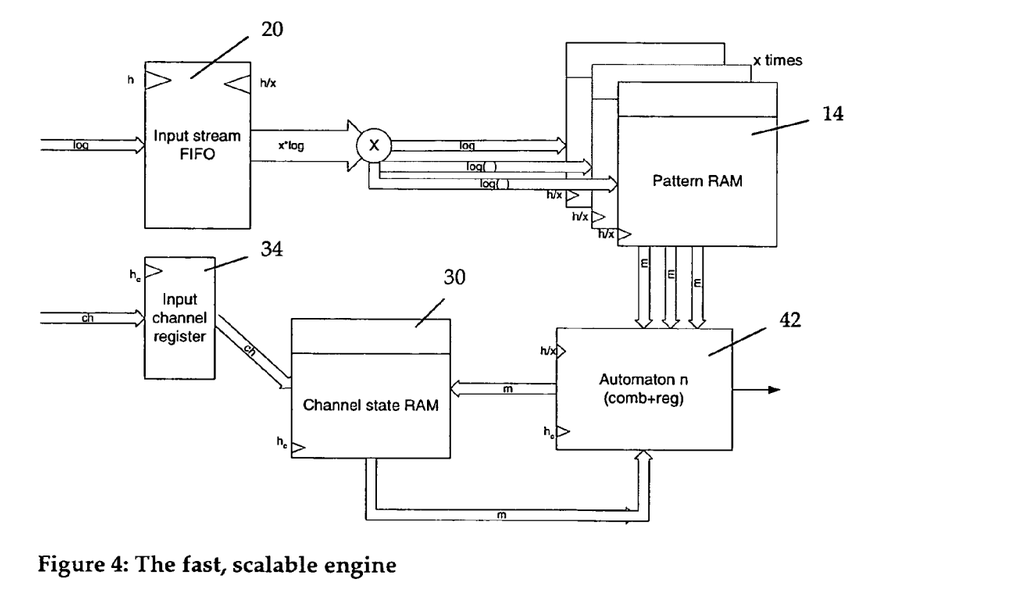
FIG. 4 shows a fast and scalable engine representing a combination of the engines of FIG. 2 and 3.

FIG. 4 illustrates a combined version of the engines shown in FIGS. 2 and 3 which includes the speed optimization as well as the support for multiple channels. Thus, in FIG. 4 input stream FIFO 20 outputs x streams which are passed in parallel to x pattern RAMs 14. The multiple outputs of the RAMs are read into automaton 42. The channel state RAM 30 and input channel register 34 functions as previously described. Hence, this invention can be used with commonly found high speed input output interfaces that support channelization. It meets the challenge of matching a pattern at high speeds (10 Gbps) and is naturally scalable to 40 Gbps in implementations. The generic channelization support allows the building of a powerful engine with fine granularity i.e. one can match the same pattern on multiple lower-speed channels.

As a result of the combined implementation the speed of the input stream can be compensated by higher speed memories or by duplicating the memory or a combination of the two. Further, the input stream can be split into channels and the engine will match simultaneously on all of them providing a finer granularity and the flexibility of matching on lower speed channels. The extra cost of adding channelization is minimal.

The foregoing description relates to an engine for matching exact streams of a length known in advance. As a further embodiment of the present invention the engine can be extended to match more complex expressions i.e. regular expressions of an arbitrary length.

Figure 8:
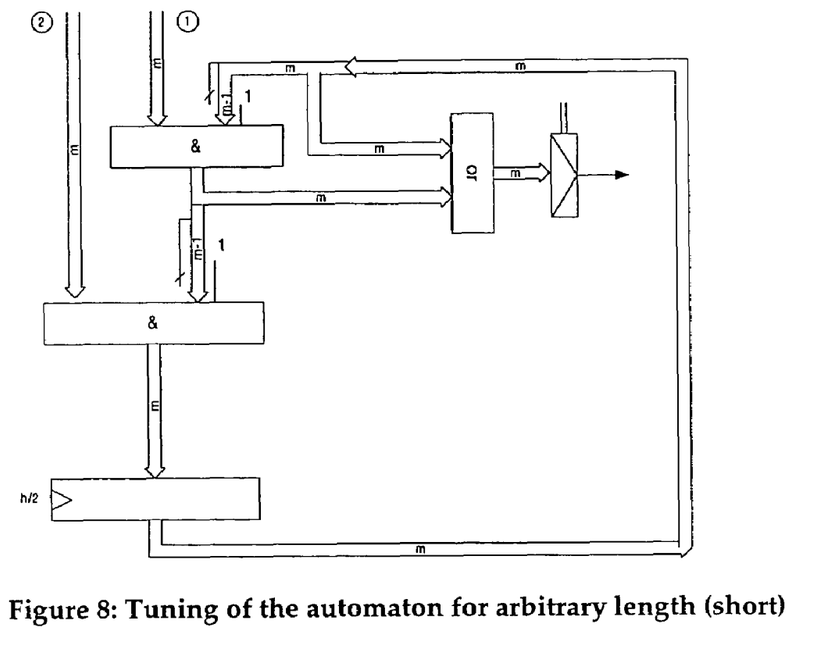
FIG. 8 shows the tuning of the automaton for arbitrary length streams.

In order accomplish this result the automaton shown in FIG. 6 is modified as shown in FIG. 8. In the previous example the engine was built to match streams that are exactly m-bits long. The modification shown in FIG. 8 allows for the matching on shorter strings that are $m_r$ long where $m_r$ is less than m.

This solution is realized by selecting which bit of the automaton marks the end of the matching process and this is done by routing the buses in an or-gate and selecting the correct bit using a simple m→1 bit multiplexer. The pattern RAM will contain the preprocessed pattern in the first $m_r$ bits following the endianess of the RAM.

This modification only allows for the matching of shorter strings than the engine is designed for i.e. $m_r$<m. However, longer strings can be matched by chaining automatons as will be described later.

The following convention (similar to the Unix regexps) will be used hereafter:

regular characters (alphanumeric characters) match against one occurrence of themselves.

meta characters:
. matches any single character
* matches any number of occurrences of the previous expression
+ matches one or more occurrences of the previous expression
[c1,c2, . . . cn] will match one occurrence of either c1, c2 . . . or cn
[c1-c2] will match one occurrence of all the characters between c1 and c2
[^ . . . ] will match one occurrence of all characters except those in brackets
e1|e2 where e1 and e2 are 2 regular expressions will match one occurrence of either e1 or e2

A desirable feature of a pattern matching engine is to be able to match on a group of characters instead of one. This includes matching meta characters like:

[c1,c2 . . . ] [^c1,c2] [c1-c2]

This means that the table P[] will contain a set of characters at each position instead of just one.

To be able to match those patterns the [Preprocessing] part of the method is tuned which creates the table R where:

the $i^{th}$ bit at line c is set iff P[i]=c is changed into the $i^{th}$ bit at line c is set iff c ∈ P[i]

Although the preprocessing is a bit more complex, the initialization of R is still trivial, and does not affect, significantly, the preprocessing time.

Figure 9:
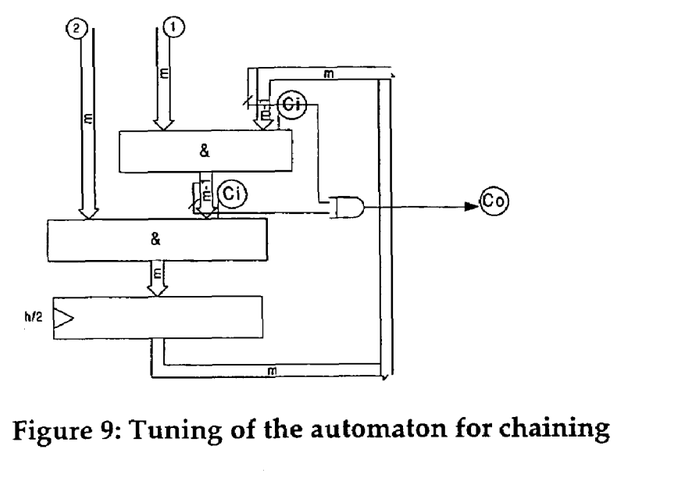
FIG. 9 shows the tuning of the automaton for a chaining operation.
Figure 10:
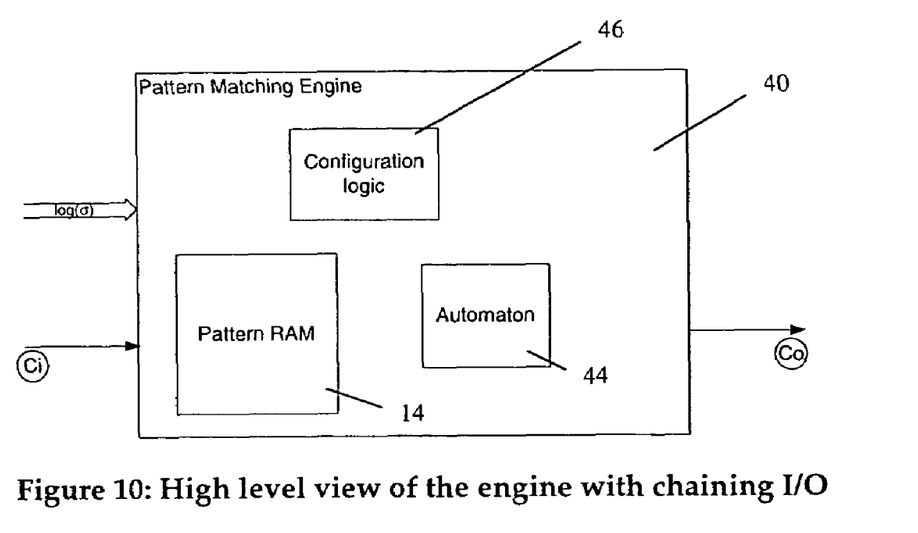
FIG. 10 is a high level view of the engine with chaining input/output.

The automaton is modified in a simple manner to add a chaining input and output, as shown in FIG. 9. The automation of FIG. 9 is the same as that shown in FIG. 6 except the chaining input Ci and chaining output Co are identified. A high level view of a pattern matching engine with chaining input and output is represented in FIG. 10. The engine 40 includes configuration logic 46, pattern RAM 14 and automation 44. The chaining input (Ci) and chaining output (Co) are shown.

Figure 11:
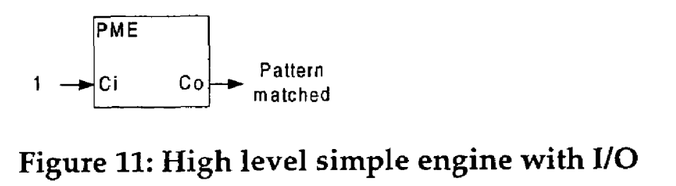
FIG. 11 is a high level view of a simple engine with input/output.

To get the behavior of the simple engine, the Ci input is tied to a logical 1, and the Co output will give the indication that the pattern has been matched against the input text. This is shown in FIG. 11.

Figure 12:
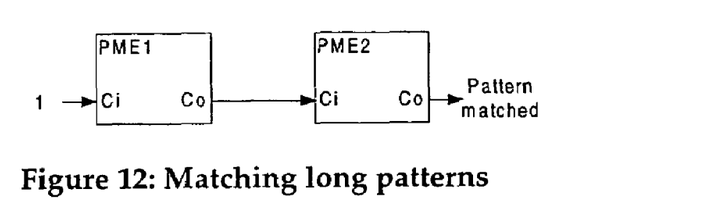
FIG. 12 illustrates the matching of long patterns.

To match a long pattern (of length L>m) multiple engines (exactly the entire part of (L/m)+1) are needed. The first engine should be programmed to match the first m characters of the pattern, the second the m following . . . up to the last engine which should be programmed to match the remaining characters. All those engines are connected in a daisy chain, with the first engine being fed a 1 and the others having their Co connected to the next engine's Ci (FIG. 12).

The last engine's Co output will give the indication whether the pattern has been matched or not.

Now consider the problem of matching an expression such as e1(e2|e3); this will match e1e2 or e1e3. Let's suppose that we have 3 engines that are capable of matching respectively e1, e2 and e3.

Figure 13:
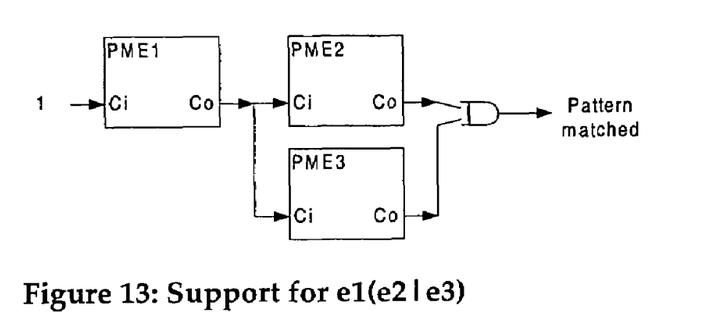
FIG. 13 shows an engine with support for e1 (e2 virtual line e3)

To match e1(e2|e3), the Co output of the first engine can be connected to both Ci inputs of the other two engines as shown in FIG. 13.

The engine of the present invention can also support matching of the arbitrary pattern .* and +. In fact, feeding a 1 on the Ci input of an engine that matches the expression e1 makes it actually match .*e1.

Figure 14:
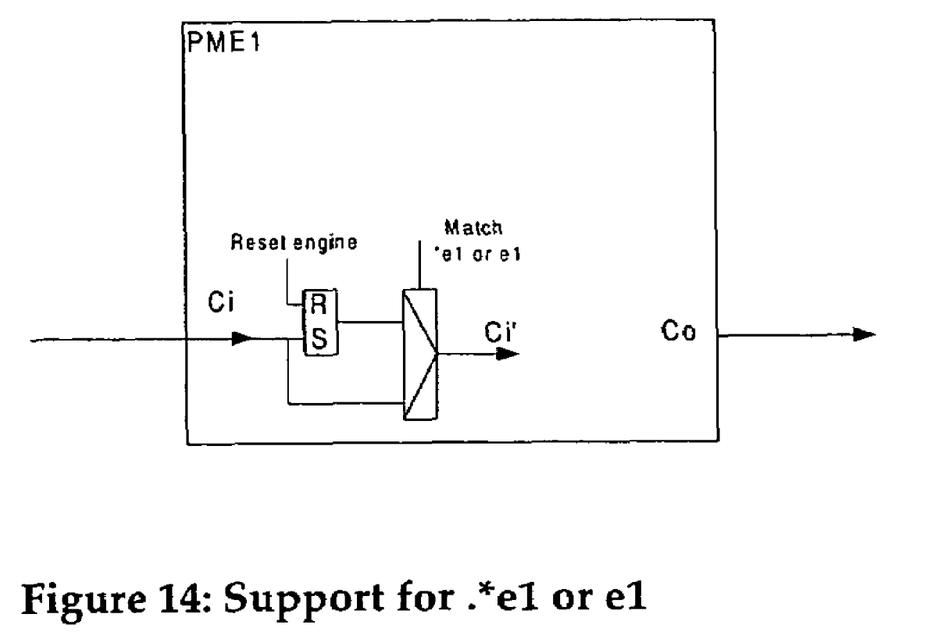
FIG. 14 shows an engine with support for e1 or 1.

However to match expressions such as e1.*e2, it is necessary to tune the engine by adding an R-S latch before the Ci input as shown in FIG. 14. The R-S latch allows, once e1 has been matched, to explore e2 while keeping active the .* rule. To put it in another way, it keeps a 1 on the Ci input of the second engine as soon as the pattern has been matched by the first engine.

Chaining this type of engine permits matching of complex expressions like e1.*e2, and also e1(e2)+ by looping the Co output back to the R-S latch, thus ensuring that the expression has been matched at least once.

Using the present embodiment a generic engine has been provided which allows for interconnecting of engines to build a powerful content inspection component that is capable of matching complex expressions at high speeds. This provides an engine that is more generic than the previously described engine and allows for engines to be combined to match really complex expressions adding a huge flexibility without compromising the speed.

Although particular embodiments of the invention have been described and illustrated it will be apparent to one skilled in the art that numerous changes can be made without departing from the basic concepts of the invention. It is to be understood that such changes will fall within the full scope of the invention as defined by the appended claims.

We claim:

1. A system for detecting a pattern in a data stream comprising:
    a FIFO for receiving an N-bit wide data stream and a corresponding first clock signal at a first rate, and outputting the data stream as a W times N-bit wide data stream and a corresponding second clock signal at a second rate, where W is an integer natural number and the second rate equals the first rate divided by W;
    a bus splitter for splitting the W times N-bit wide data stream into W data streams of width N;
    a plurality (W) of RAMs, each RAM for storing data obtained by processing the pattern and for receiving a respective one of the data streams of width N as an address and the second clock signal as a clock, and each RAM being operable to output a portion of the data on an M-bit wide output bus in accordance with a value of the address;
    a processor for receiving the portions of data on each M-bit wide output bus as data and the second clock signal as a clock, and being operable to determine whether the pattern is in the data stream in dependence upon the received portions of data and the received clock, and for outputting a pattern match signal indicating detection of the pattern in the data stream; and
    a channel state RAM for storing the state of the processor and running C times slower the data rate.

2. The system as defined in claim 1 wherein the processor comprises shift/and combinatory logic and a register.

3. The system as defined in claim 1 having channelization functionality including an input channel register and a channel state RAM running C times slower than the first rate.

4. The system as defined in claim 3 wherein the processor includes means to update the channel state RAM in response to a state change.

5. The system as described in claim 1 wherein the data stream is of a known length.

6. The system as described in claim 1 adapted to detect a pattern of arbitrary length wherein the length is less than a set value.

7. The system as described in claim 6 wherein multiple engines are chained to detect a pattern of any arbitrary length.

8. A system for detecting a pattern in a data stream comprising:
    an input stream register for receiving the data stream and a corresponding first clock signal at a first rate, and outputting the data stream and a corresponding second clock signal at a second rate;
    a pattern RAM for storing a pattern to be detected;
    a processor for receiving the data and the second clock signal as a clock, and being operable to determine whether the pattern is in the data stream in dependence upon the received data and the received clock, and for outputting a pattern match signal indicating detection of the pattern in the data stream
    a channel state RAM for storing the state of the processor and running C times slower the data rate
    a multiplexer that redirects either the contents of the processor's register or the contents of the channel state RAM to the processor; and
    a channel register to switch the processor in dependence on the received data.

9. The system as defined in claim 8 wherein said input stream register is a FIFO for receiving an N-bit wide signal and having bus splitting means to divide said stream into W signals, each of said W signal provided to separate pattern RAMs.

10. The system as described in claim 8 wherein the data stream is of a known length.

11. The system as described in claim 8 adapted to detect a pattern of arbitrary length wherein the length is less than a set value.

12. The system as described in claim 8
    the processor having combinatory logic means for receiving outputs from pattern matching RAMs;
    a register and an And Gate for combining the outputs from respective logic means to output an indication of a matched pattern.

13. A method of detecting a pattern in a data stream comprising:
    receiving, at a FIFO, an N-bit wide data stream and a corresponding first clock signal at a first rate, and outputting the data stream as a W times N-bit wide data stream and a corresponding second clock signal at a second rate, where W is an integer natural number and the second rate equals the first rate divided by W;
    splitting the W times N-bit wide data stream into W data streams of width N;
    providing a plurality (W) of RAMs, each RAM for storing data obtained by processing the pattern and for receiving a respective one of the data streams of width N as an address and the second clock signal as a clock, and each RAM being operable to output a portion of the data on an M-bit wide output bus in accordance with a value of the address;
    receiving the portions of data on each M-bit wide output bus as data and the second clock signal as a clock at a processor, the processor being operable to determine whether the pattern is in the data stream in dependence upon the received portions of data and the received clock, and outputting a pattern match signal indicating detection of the pattern in the data stream; and a channel state RAM for storing the state of the processor and running C times slower the data rate.

14. The method as defined in claim 13 further comprising:
providing means for adding channelization functionality in order to separate the input stream into channels for pattern matching.

15. A method of detecting a pattern in a data stream comprising:
receiving the data stream and a corresponding first clock signal at a first rate at an input stream register and outputting the data stream and a corresponding second clock signal at a second rate;
storing a pattern to be detected at a pattern RAM;
receiving the data and the second clock signal as a clock at a processor, the processor being operable to determine whether the pattern is in the data stream in dependence upon the received data and the received clock, and outputting a pattern match signal indicating detection of the pattern in the data stream;
providing a channel state RAM for storing the state of the processor and running C times slower the data rate
redirecting either the contents of the processor's register or the contents of the channel state RAM to the processor; and
switching the processor in dependence on the received data.

16. The method as defined in claim 15 wherein multiple pattern matching RAMs are provided to provide scalability.

* * * * *